Nov. 14, 1961   J. T. MATTHEWS   3,008,778
SWIVEL BEARING WITH MOVEMENT LIMITING MEANS
Filed Sept. 6, 1956   2 Sheets-Sheet 1
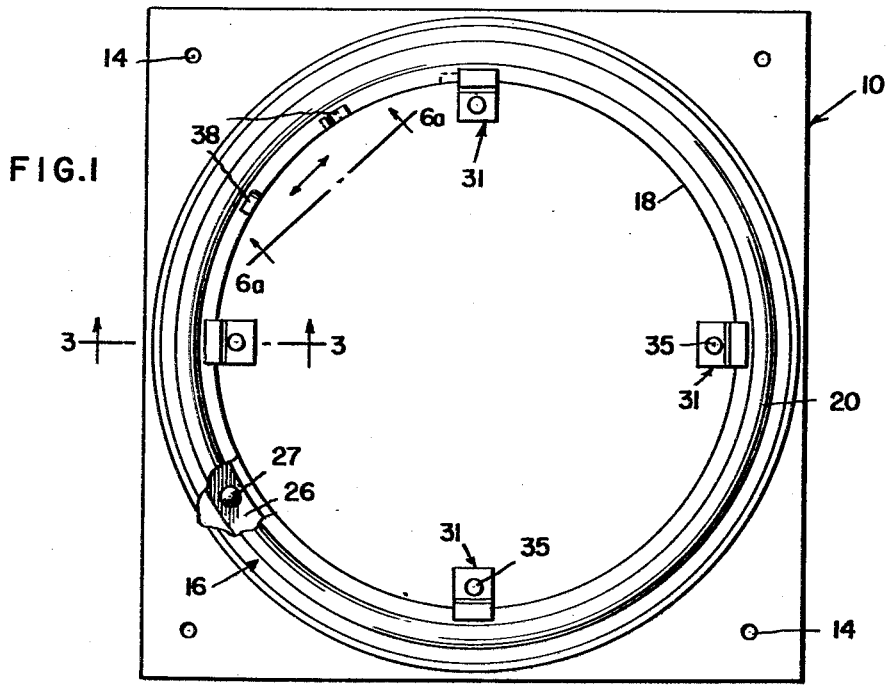
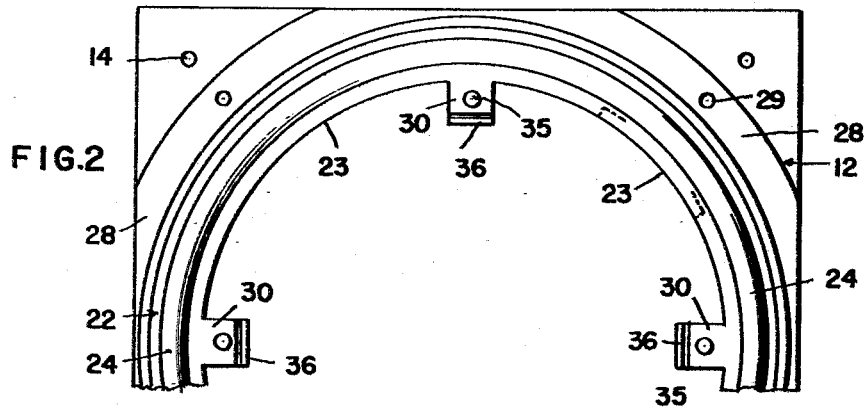
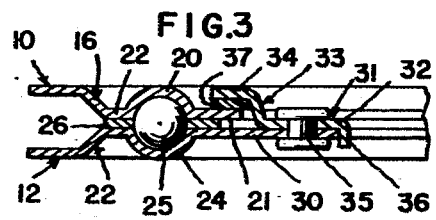
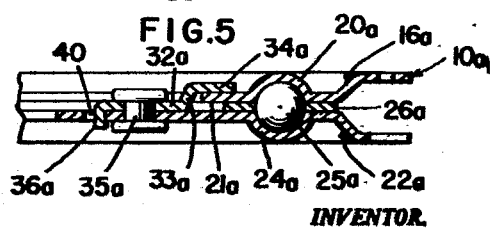
INVENTOR.
John T. Matthews
BY
Shoemaker & Mattare
ATTYS

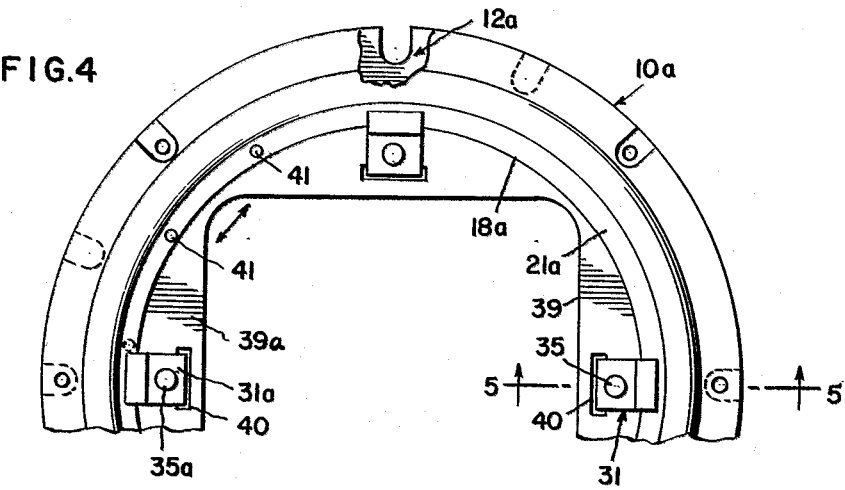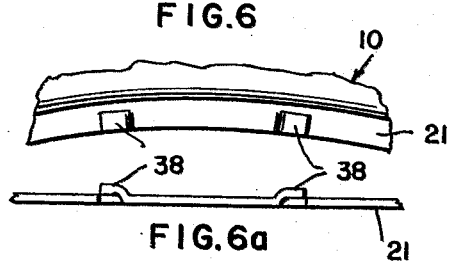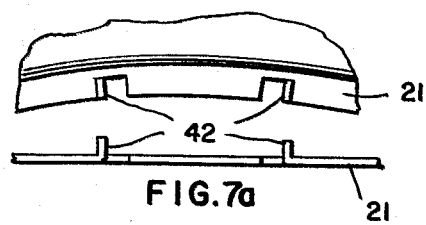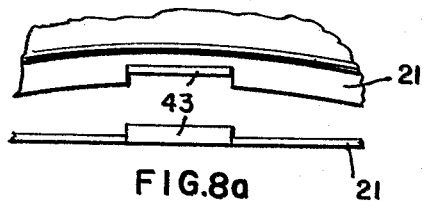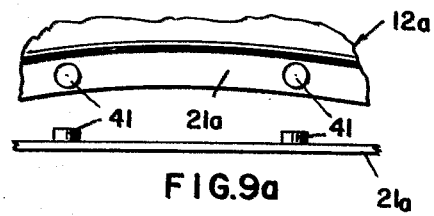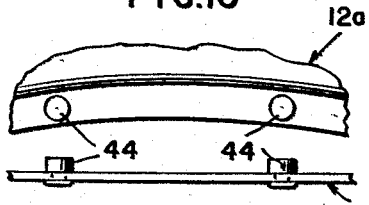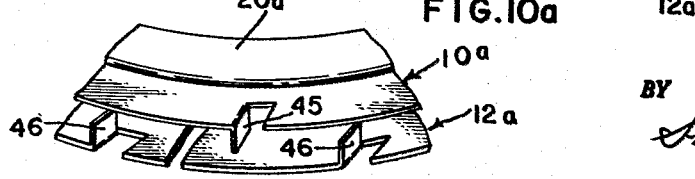

United States Patent Office 3,008,778
Patented Nov. 14, 1961

3,008,778
SWIVEL BEARING WITH MOVEMENT LIMITING MEANS
John T. Matthews, 2511 Wilkinson Blvd., Charlotte, N.C.
Filed Sept. 6, 1956, Ser. No. 608,222
14 Claims. (Cl. 308—227)

This invention relates to improvements in bearings and is directed more particularly to bearings for swivelly or rotatably mounting heavy bodies.

Swivel bearings for rotatably mounting television sets, both for table and console models, are known. Such known bearings embody superposed members formed with opposing coacting or cooperating raceways for antifriction elements and a means for retaining the members in assembled relation for relative rotation. However, the construction or design of such known types or forms of bearings is such that an insufficient amount of metal is provided outside of the area defined by the raceways for effectively or satisfactorily mounting the swivel or securing it to the structure to be supported and to the underlying support, such as a table or other base structure.

It is also important that in the use of such bearings for mounting electrical equipment such as television sets and the like, where it is desirable that they be turned from time to time to different positions, a means be provided to protect the electric cords or wiring running from the outlet to the equipment so that such wiring will not be damaged when the equipment is turned.

An object of the present invention, in the light of the foregoing, is, accordingly, to provide a new and improved swivel construction for mounting television sets, either of the type known as a table model or console models, although the invention is not, of course, restricted to such use, wherein there is provided a means for coupling together relatively rotatable superposed members of such character that the restriction of the spacing or placement of holes for mounting screws, bolts or other securing elements is avoided, thereby providing for or allowing a greater amount of the metal on the outer side of the bearing races at the holes for mounting the plates or securing the plates to the bodies between which they are located and wherein in association with such coupling means, there is provided a means for preventing excessive relative rotary movement of the members to avoid damaging electric cords leading to equipment on the swivel.

Another object of the invention is to provide a swivel mounting of the character stated wherein the upper and lower plate members, which are separated by antifriction elements, are designed in a novel manner to facilitate the employment of coupling devices within the circular area defined by the raceways for the antifriction elements and wherein the said means for preventing the said excessive rotary movement is also disclosed within said circular area.

Still another object of the invention is to provide a swivel of the character stated wherein the upper and lower bearing plates are provided one with a means for attaching a retaining or coupling clip thereto and the other with an annular trackway with which a portion of the coupling clip or coupling clips engage, the trackway and coupling clips being located entirely within the circular area defined by the antifriction element raceways and functioning in cooperation with means carried by said trackway to limit the turning movement of the plates relative to one another.

A further and more specific object of the invention is to provide a new and improved swivel structure embodying superposed plates having a plurality of antifriction elements located therebetween and disposed in a circular arrangement, with a number of holding or coupling clips rigidly secured to one of the plates within the area defined by such antifriction elements and a means forming a part of the other plate over and against which portions of such clips extend and bear to maintain the plates against separatory movement while at the same time permitting the plates to have desired relative rotary movement in combination with stops carried by said other plate for engagement by a clip whereby to limit the turning of the other plate relative to the plate carrying the clips.

The invention will be best understood from the following detailed description taken in connection with the accompanying drawings forming a part of the specification, with the understanding that the invention is not confined to a strict conformity with the showing of the drawings but may be changed or modified so long as such changes or modifications constitute no material departure from the salient features of the invention as expressed in the appended claims.

In the drawings:

FIG. 1 is a view in plan of a bearing constructed in accordance with one embodiment of the present invention and showing also one embodiment of the stop means or movement limiting means of the invention, a portion of the structure being shown broken away to illustrate a detail;

FIG. 2 is a view in plan of a portion of the reverse side of the bearing structure shown in FIG. 1;

FIG. 3 is a sectional view on an enlarged scale, taken substantially on the line 3—3 of FIG. 1;

FIG. 4 is a view in plan of a portion of a second embodiment of the bearing structure in association with which the movement limiting or stop means is employed, a portion of this structure also being broken away to show a portion of the underlying plate;

FIG. 5 is a sectional view on an enlarged scale, taken substantially on the line 5—5 of FIG. 4;

FIGS. 6 and 6a illustrate a portion of the track lying within the bearing raceway showing the same in top plan and in edge elevation and illustrating the manner in which a pair of stops or movement limiting elements are formed therein;

FIGS. 7 and 7a illustrate another method of forming a pair of stops in the track, the stops being shown respectively in top plan and in edge elevation;

FIGS. 8 and 8a illustrate still another method of forming the stop means comprising a single elongate struck-up portion of the track;

FIGS. 9 and 9a illustrate in top plan and in edge elevation stops in the form of studs or buttons welded directly to the surface of the track; and FIGS. 10 and 10a illustrate the use of the studs and buttons applied to the track in the form of rivets.

FIG. 11 is a fragmentary perspective view of the outer side of one of the swivel units showing another method of employing the stops for limiting relative rotary motion between the upper and lower swivel parts.

Referring now more particularly to the drawings, there are illustrated in FIGS. 1 to 5 two forms of swivel structure of improved design which swivel forms per se form the subject matter of my copending application Serial No. 558,062, filed January 9, 1956, now Patent No. 2,895,770.

The present invention is directed to the improved construction embodying these swivels together with means whereby the relative rotation of the plate members may be limited for the purpose of protecting electrical equipment in the manner hereinbefore set forth, that is, by preventing the accidental breaking or damage to electrical current conducting cables which may lead to equipment supported by the swivel.

The swivel structure illustrated in FIGS. 1 to 3 comprises two superposed plates which are identified by the reference characters 10 and 12 and which for convenience in describing the same may be further identified by defining the plate 10 as the upper plate and the plate 12 as the lower plate, although obviously in use the plate positions may be reversed.

The upper plate 10 is rectangular as shown and is provided in the corner portions with screw or bolt apertures 14 by which it may be conveniently secured to a support or body to be supported.

The plate 10 has a central circular depressed area 16 which is offset from the surrounding outer portion as indicated in FIG. 3 and this depressed portion has a concentric circular opening 18 therein. The depressed portion 16 is further pressed to provide the annular bearing channel or raceway 20 which is bordered by the inner and outer flat portions 21 and 22, the portion 21 constituting a track for the purpose hereinafter set forth.

The bottom plate 12 is also pressed to form a circular offset portion 22 corresponding to the offset portion 16 of the top plate 10 and this plate also has the central opening 23 of generally circular outline concentric with the circular offset portion 22 and such offset portion is pressed to provide the bearing ball channel or race 24 which is of the same diameter as the race 20, and when the plates are in assembled relation the channels have their concave sides in cooperative opposing relation as shown in FIG. 3 to receive a number of bearing balls 25. As shown in FIG. 3, the channels 20 and 24 have a depth of less than half of the diameter of the bearing balls so that the balls function to maintain the plates in spaced relation.

The spacing maintained between the plates by the balls 25 is occupied by a ball cage or retainer 26 which is here shown as being in the form of a flat annulus having apertures at spaced intervals in which the bearing balls are located, one such aperture being indicated in FIG. 1 by the reference character 27.

It will also be seen upon reference to FIG. 3 that the offset portions 16 and 22 of the two plates are directed toward one another so that the parts of the plates lying outwardly thereof are substantially widely spaced apart.

As shown in FIG. 2, the plate 12 has its corners cut off or made circular so that the angular corners of the top plate are exposed and these rounded or circular corner portions of the bottom plate 12 which are designated 28 are provided with apertures 29 to receive securing elements by which the plate is attached to a support or to the body to be supported by the swivel.

By cutting off or rounding off the corners of one plate, here designated as the bottom plate 12, in the manner illustrated, it will be seen that access can be readily had to the apertures 14 of the top plate whereby to secure the plate in position.

The bottom plate is provided around the edge of the opening 23 with inwardly extending rigid tongue portions 30. These project beyond the edge of the opening 18 of the top plate, the diameters of the openings of the two plates being approximately the same, as shown.

Each of the tongues 30 has secured thereto a coupling or holding member or clip which is generally designated 31 and which comprises, as shown in FIG. 3, a body portion 32 which positions upon the side of the supporting tongue 30 nearest to the top plate and has an upwardly and outwardly angled intermediate portion 33 which joins a terminal portion 34. This terminal portion 34 extends radially outwardly and overlies the outer side of the track 21 of the plate 10. The body portion 32 of the clip is secured to the tongue 30 by a rivet or other suitable means which is designated 35 and the inner end of the body portion 32 has a downturned flange 36 which extends across the inner edge of the supporting tongue and holds the clip against turning movement thereon.

The coupling members or clips supported by the tongues, which are here shown as four in number, by engaging over the track 21, maintain the two plates against axial separation but permit the same to have relative rotation.

The terminal portion 34 of each of the clips may contact directly against the outer side of the track 21 or an anti-friction facing 37 may be secured to the terminal portion of the clip for sliding engagement with the surface of the track. Any suitable material for this facing may be employed but a nylon material is preferred as this provides the desired sliding engagement or anti-friction qualities with long wear.

In this one embodiment of the swivel structure there is illustrated one of several desirable means by which to limit the relative rotation of the plates. This rotation limiting means is designed to coact with the clips and in the construction illustration in FIG. 1, the means comprises a pair of struck-out portions of the track 21 which form tongues 38 which, as is more clearly illustrated in FIG. 6a, lie slightly above the top surface of the track 21. These tongues are cut or struck from the edge of the track and rise thereabove to a sufficient extent to engage the sides of the terminal portions 34 of adjacent holding clips 31. The movement limiting tongues or stops 38 are provided in a pair which are spaced the desired distance apart so that the top plate when moved in one direction will have the movement limited by the engagement of one tongue with a clip toward which the tongue is caused to move and when moved in the other direction the other tongue will engage with the clip nearest thereto. By varying the spacing between the tongues the extent of rotary movement in either direction of the top plate can be predetermined.

While two spaced stops 38 have been illustrated in FIG. 1, it will, of course, be apparent that if a greater degree of movement of the top plate is desired than would be afforded by having two spaced stops, a single stop might be employed.

FIGS. 4 and 5 illustrate a second embodiment of the swivel structure in association with which stops of the character shown in FIGS. 1, 6 and 6a may be employed, or other types of stops as hereinafter described.

In this second embodiment of the swivel the general construction is substantially the same as that shown in FIGS. 1 and 2 in respect to the location or disposition of the clips and the manner in which they engage one of the plates. In this second construction the upper and lower plates are generally designated 10a and 12a respectively and are both of circular configuration exteriorly and of approximately the same diameter. The upper one of these plates which is designated 10a has a circular depressed portion 16a and a central circular opening 18a. The portion 16a is formed in a similar manner to the portion 16 of the first described structure in that it is pressed to provide an annular bearing ball channel or raceway 20a and the portion of the plate between this channel and the opening 18a provides an annular track 21a.

The lower plate 12a likewise has a central depressed or offset portion which is generally designated 22a and this is cut out to provide the rectangular opening 39 which lies entirely within the area defined by the circular opening 18a thereby forming or providing the webs 39a.

This offset portion 22a has a bearing channel 24a pressed therein to form a raceway and confronts the channel 20a to receive bearing balls 25a which function to maintain the plates in slightly spaced relation for free rotational movement. These bearing balls may be maintained spaced apart in the raceways or channels by a suitable means such as the annulus 26a which is provided with openings for the balls and forms a conventional cage.

The webs 39a which form a part of the bottom plate and lie within the circular area of the opening 18a are provided with slots 40, here shown as four in number and equidistantly spaced around the circle 18a.

Each of the webs has mounted upon the face thereof which is nearest to the top plate, a holding clip 31a which, like the clips 31, comprise a body portion 32a, an intermediate portion 33a and a radially outwardly extending terminal portion 34a. The body portion of each clip is secured by a rivet 35a or in any other suitable manner to its supporting web and the offset portion 33a elevates the terminus or terminal portion 34a so that it may engage over the top surface of the track 21a, as shown in FIG. 5.

The inner end of the body portion has a downturned flange 36a which engages in the slot 40, as illustrated.

While in FIG. 5 the terminal portion 34a of the clip 31a has been shown in direct engagement with the outer face of the track 21a, a suitable antifriction bushing or bearing of nylon or other suitable material may be interposed between the clip and the track as in the first described form of the structure.

For limiting the relative rotary movement between the plates 10a and 12a there are shown fixed to the track 21a two spaced studs 41 which upon rotation of the top plate will engage with the adjacent clips 31a. These studs may be spaced apart to any desired extent in the same manner as the up-struck stops 38 so that the extent of rotation of the top plate may be predetermined, it being readily apparent that when the top plate is turned in either direction one of the studs will come into engagement with the clip nearest thereto, the clip in this case, as in the first described structure thus having the second function of forming an element of the movement limiting means in addition to holding the plates against separation while permitting them to turn one with respect to the other.

In addition to the two types of movement limiting means or stops, shown in FIGS. 6, 6a and 9, 9a, the means illustrated in FIGS. 7, 7a and 8, 8a may be employed. In FIGS 7, 7a the track which is here designated 21 has a portion of the material cut to form a tongue which is turned to extend upwardly as indicated at 42 instead of merely being pressed to a parallel offset position like the tongue 38.

In FIGS. 8 and 8a there is shown a single relatively long stop which is formed by cutting two slits inwardly from the free edge of the track 21 and turning up the material between the slits, thus forming the long upstanding stop tongue 43. As will be readily apparent, this long tongue 43 can be made of any length so that it will thus function by engagement of its ends with the adjacent clips in the same manner as the two spaced stops 38 and 42.

The stops formed as upstanding studs 41 illustrated in FIGS. 9 and 9a may be welded to the metal of the track 21a or they may form straight punched-up parts of the track metal or studs in the form of rivets such as those shown in FIGS. 10 and 10a and designated 44, may be provided. In the latter case it will be apparent that the method of fixing these stops in position consists in forming apertures in the track and inserting reduced end portions of the studs in the apertures and swaging over the end portions on the opposite side of the track from which the stud projects.

In the foregoing description of the invention, the limiting stops have been illustrated in connection with each of the two forms of swivel as being within the area defined by the raceways and positioned to coact with the clips 31 and 31a. In the use of four clips for holding the two relatively movable parts of the swivel together, the maximum extent of rotation accordingly would be slightly less than the 90°.

In FIG. 11, another arrangement of the stops is shown which permits a greater degree of relative movement between the swivel parts as, for example, with this latter arrangement one of the plates of the swivel may be permitted to rotate through an extent of slightly less than the full 360°. In other words, with this latter arrangement, the plates can be held to a very small degree or extent of movement or permitted to rotate nearly to the complete circle of rotation.

In this structure illustrated in FIG. 11, the stops are located in the outer portions of the plates or exteriorly of the raceways and the embodiment of the swivel shown in FIG. 4 has been selected to illustrate the use of the stops in the outer portions of the plates although it is to be understood that this arrangement may also be employed in the embodiment shown in FIGS. 1 and 2.

Any one of the several types of stops illustrated in FIGS. 6 to 10 inclusive may be employed in the outer portions of the swivel plates. In FIG. 11, the upper and lower plates 10a are shown as having the peripheral portions provided with struck-out tongues, the upper plate 10a having the struck-down tongue 45 which is directed toward the lower plate 12a while the lower plate is provided at spaced locations with the up-struck tongues or stops 46. The spaced or pair of stops 46 can be set at any desired location or spacing around the circumference of the plate and the single depending stop 45 is located to move between the stops 46. Thus the extent of rotation of the upper plate 10a with respect to the lower plate 12a can be regulated as desired. Also, it will be obvious that if substantially a full relative rotation of the plates is desired, one only of the lower or up-struck tongues or stops 46 may be used.

It will be understood that the stops 45 and 46 lie outside of the raceways and thus when these are used in place of the previously described stops lying inside the raceways, the clips holding the plates together will not take part in controlling the rotation of the plates. The stops 45 and 46 have been shown as cut out from the edges of the plates in the same manner as the stops 42 hereinbefore described, are formed, the cut out portions then being bent in the proper direction so that one will abut another when the plates are rotated. In addition to this method of forming the stops, the methods illustrated in FIGS. 6, 8, 9 and 10 may also be employed is desired, that is, the metal may be merely pushed up instead of being bent at right angles to the surface of the plate or the plates may have fixed thereto integrally formed studs such as the studs 41 or rivets such as those shown at 44 in FIG. 10.

From the foregoing it will be seen that by the provision in swivels of the character herein disclosed of the illustrated and described means for limiting the rotational movement of one swivel plate relative to the other, the swivels may be safely employed for supporting any body which may be desired to rotate to a predetermined extent, but which for safety reasons or other reasons, it is important to prevent its rotation beyond a certain degree.

I claim:

1. A swivel of the character described comprising an upper member and a lower member, said members having confronting concentric annular bearing raceways, means for securing said members respectively to structures to be connected by the swivel, means secured to one member within the circular area defined by the raceways and having sliding engagement with the other member within said circular area for restraining axial separatory movement between the members while permitting relative rotation thereof, and a stop means carried by the other one of the members for engagement with the restraining means upon a predetermined degree of relative turning of the members.

2. A swivel comprising upper and lower substantially flat members, a plurality of anti-friction elements disposed in a circular arrangement between and having rotating engagement with the opposed sides of said members, means for retaining said elements in said circular arrangement, one of said members having an axially directed flat circular track surface lying within the area defined by the circular arrangement of said elements, means secured to the other member and bearing on said track for permitting rotation of said one member relative to the other member while holding the members against separation, means located outside of the area defined by the circular arrangement of said elements for facilitating attachment of the members to bodies between which the swivel is located, and coacting elements carried by the members for limiting relative rotation of the members, one of said coacting elements being carried by and secured to and extending from said circular track surface and engaging the other one of said coacting elements upon a predetermined relative rotation of the members to limit such rotation.

3. A swivel comprising upper and lower substantially flat members, a plurality of anti-friction elements disposed in a circular arrangement between and having rotating engagement with the opposed sides of said members, means for retaining said elements in said circular arrangement, holding clips secured to one of said members within the area defined by the circular arrangement of said elements, means forming a sliding connection between said clips and the other one of the members within said area for permitting relative rotation of the members while holding the members against separation, means outside of the said area for facilitating attachment of the members to bodies between which the swivel is located, and coacting means carried by the members inside of the said area for limiting relative rotation of the members, one of said coacting means being carried by said other one of said members and engaging the other one of said coacting means upon a predetermined relative rotation of the members to limit such rotation.

4. A swivel comprising two mounting plates arranged in superposed relation, a plurality of rotatable anti-friction elements disposed in a circular arrangement between the plates and maintaining the plates separated for relative rotation, said plates each having an opening within and through a major portion of the area defined by the said circular arrangement of elements, means located within said area for coupling the plates and holding them against separation beyond the sepaartion maintained by the anti-friction elements while permitting free relative rotational movement, means facilitating attachment of the plates to bodies between which the swivel is located, and coacting stop elements located within said area and carried by said plates for limiting the said free relative rotational movement of the plates, said coupling means forming one of the stop elements.

5. A swivel comprising two mounting plates arranged in superposed relation, a plurality of rotatable anti-friction elements disposed in a circular arrangement between the plates whereby relative rotation of the plates is permitted, means forming a part of one plate lying within the area defined by said arrangement of elements providing a circular track which is concentric with the circle of elements, coupling means between the paltes and lying in said area and having sliding engagement with said track, means connected with the other plate for supporting said coupling means, said coupling means being rigidly secured to the supporting means therefor, a stop element carried by the track for engagement with a coupling means to limit the relative rotational movement of the plates, and means facilitating attachment of the plates to bodies between which the swivel is located.

6. A swivel comprising two mounting plates arranged in superposed relation, a plurality of rotatable anti-friction elements disposed in a circular arrangement between the plates whereby relative rotation of the plates is permitted, means forming a part of one plate lying within the area defined by said arrangement of elements providing a circular track which is concentric with the circle of elements, the other plate having a portion thereof located in said area and extending radially inwardly beyond said track, coupling elements secured to said portion and engaging a surface of said track for holding the plates against separatory movement, the said one plate being rotatable with respect to the other plate and to said coupling elements, a stop element carried by the track for engagement with a coupling element to limit the relative rotational movement of the plates, and means facilitating the attachment of the plates to bodies between which the swivel is located.

7. A swivel comprising two mounting plates arranged in superposed relation, a plurality of rotatable anti-friction elements disposed in a circular arrangement between the plates whereby relative rotation of the plates is permitted, means forming a part of one plate lying within the area defined by said arrangement of elements providing a circular track which is concentric with the circle of elements, the other plate having a portion thereof located in said area and extending inwardly from said track, coupling clips each comprising a body portion rigidly secured to said plate portion and a tongue overlying and coacting with the track to retain the plates against separatory movement but permit rotation of the one plate relative to the other, a stop element carried by the track for engagement with a coupling clip to limit the relative rotational movement of the plates, and means facilitating the attachment of the plates to bodies between which the swivel is located.

8. The invention according to claim 7, wherein the rigid securement of each clip to the said plate portion is effected by a fastener passing through the clip body portion and the plate portion, and coacting coupling means between the clip body portion and the plate portion for holding the clip against turning about the fastener.

9. A swivel comprising two mounting plates arranged in superposed relation, a plurality of rotatable anti-friction elements disposed in a circular arrangement between the plates, means maintaining said elements in said circular arrangement, each of said plates having a central opening, means joined to one plate and forming a circular track within the area defined by said circular arrangement of elements and concentric therewith, the other plate having a plurality of apertures of polygonal edge contour therein within said area, a plurality of clip members each comprising a body secured on said other plate and having an end portion of polygonal form engaged in one of said apertures and held against turning by engagement against the edge portions of the aperture and having an opposite end portion forming a tongue overlying and coacting with said track to hold the plates against separation, a stop element carried by the track for engagement with a clip member to limit the relative rotational movement of the plates, and means for facilitating attachment of the plates to bodies between which the swivel is located.

10. A swivel comprising two mounting plates arranged in superposed relation, a plurality of rotatable anti-friction elements disposed in a circular arrangement between the plates, means maintaining said elements in said circular arrangement, each of said plates having a central opening, means joined to one plate and forming a circular track within the area defined by said circular arrangement of elements and concentric therewith, a plurality of tongues extending inwardly from the edge of the opening in the other plate, a coupling clip secured to each tongue and having an angled end portion engaging across the end of the tongue and having an offset opposite end portion engaging over the circular track, the clips securing the plates against separation but permitting relative rotation of the plates and said angled end portion engaging the tongue and holding the clip against turning, a stop element carried by the track for engagement with a coupling clip to limit the relative rotational movement of the plates, and means for facilitating attachment of the plates to bodies between which the swivel is located.

11. A swivel comprising upper and lower substantially flat members, a plurality of anti-friction elements disposed in a circular arrangement between and having rotating engagement with the opposed sides of said members, means for retaining said elements in said circular arrangement, one of said members having a circular track within the area defined by the circular arrangement of said anti-friction elements, means secured to the other member and bearing on said track for permitting rotation of said one member relative to the other member while holding the members against separation, means for facilitating attachment of the members to bodies between which the swivel is located, and coacting stop elements carried by the members for limiting relative rotation of the members, one of said elements forming a struck-out portion of the track and engaging the other element upon a predetermined relative rotation of the members to limit such rotation.

12. A swivel comprising upper and lower substantially flat members, a plurality of anti-friction elements disposed in a circular arrangement between and having rotating engagement with the opposed sides of said members, means for retaining said elements in said circular arrangement, one of said members having a circular track within the area defined by the circular arrangement of said elements, means secured to the other member and bearing on said track for permitting rotation of said one member relative to the other member while holding the members against separation, means for facilitating attachment of the members to bodies between which the swivel is located, and coacting stop elements carried by the members for limiting relative rotation of the members, one of said stop elements constituting a stud carried by and standing up from the track and engaging the other element upon a predetermined relative rotation of the members to limit such rotation.

13. A swivel of the character described comprising an upper member and a lower member, said members having confronting concentric annular bearing raceways, means for securing said members respectively to structures to be connected by the swivel, means secured to one member within the circular area defined by the raceways and having sliding engagement with the other member within said circular area for restraining axial separatory movement between the members while permitting relative rotation thereof, means carried by the other one of the members forming a stop, and means carried by said one member and engageable by said stop forming means for limiting the extent of turning of one of the members relative to the other member.

14. A swivel comprising two substantially flat superposed plate bodies, one of said plate bodies having a central circular opening therethrough, the plate bodies having opposing annular channels therein coacting to form an anti-friction element retaining raceway concentric with said circular opening, anti-friction elements in said raceway, each of said channels being between and bordered by inner and outer coplanar portions of the associated plate body, the inner one of the coplanar portions of the said one plate body forming a track flange defining said opening, the surface of the track flange axially removed from the inner portion of the other plate body forming a track surface, means carried by the inner portion of said other plate body and overlying and having sliding engagement with said track surface for holding said plate bodies against axial separation while permitting relative axial rotation therebetween, the said flat coplanar portions of the two plate bodies being substantially parallel, a stop means carried by a flat portion of each of the plate bodies, the stop means of one plate body engaging the stop means of the other plate body upon a predetermined extent of relative turning of the plate bodies, and means for facilitating the attachment of the plate bodies to bodies between which the swivel is located.

References Cited in the file of this patent

UNITED STATES PATENTS

| | | |
|---|---|---|
| 671,736 | Stimpson | Apr. 9, 1901 |
| 779,573 | Barber | Jan. 10, 1905 |
| 1,301,495 | Otte | Apr. 22, 1919 |
| 1,801,204 | Leuzinger | Apr. 14, 1931 |
| 2,346,167 | Jones et al. | Apr. 11, 1944 |
| 2,648,579 | Slyter et al. | Aug. 11, 1953 |
| 2,671,631 | Fox | Mar. 9, 1954 |
| 2,678,854 | Card | May 18, 1954 |
| 2,687,924 | Gomersall | Aug. 31, 1954 |
| 2,726,907 | Krauss | Dec. 13, 1955 |
| 2,895,770 | Matthews | July 21, 1959 |

FOREIGN PATENTS

| | | |
|---|---|---|
| 943,690 | Germany | May 24, 1956 |